United States Patent [19]

Vincent et al.

[11] Patent Number: 5,311,612
[45] Date of Patent: May 10, 1994

[54] CASSETTE FOR OPTICAL FIBERS

[75] Inventors: Alain Vincent, Juilly; Michel Milanowski, Anserville, both of France

[73] Assignee: Mars Actel, Vrigne Aux Bois, France

[21] Appl. No.: 21,478

[22] Filed: Feb. 22, 1993

[30] Foreign Application Priority Data

Feb. 21, 1992 [FR] France ............... 92 02029

[51] Int. Cl.⁵ .................................. G02B 6/00
[52] U.S. Cl. ......................... 385/135; 385/147
[58] Field of Search ............... 385/134, 135, 136, 137, 385/138, 139, 140, 147

[56] References Cited

U.S. PATENT DOCUMENTS

| | | | |
|---|---|---|---|
| 5,115,489 | 5/1992 | Norris | 385/135 |
| 5,167,001 | 11/1992 | Debortoli et al. | 385/135 |
| 5,206,927 | 4/1993 | Finzel et al. | 385/135 |
| 5,222,183 | 6/1993 | Daems et al. | 385/135 |

FOREIGN PATENT DOCUMENTS

| | | |
|---|---|---|
| 0216073 | 4/1987 | European Pat. Off. . |
| 0368445 | 5/1990 | European Pat. Off. . |
| 0434530 | 6/1991 | European Pat. Off. . |

OTHER PUBLICATIONS

Patent Abstracts of Japan, vol. 7, No. 121 (P-199) (1266), May 25, 1983.

Primary Examiner—Akm E. Ullah
Attorney, Agent, or Firm—Sughrue, Mion, Zinn, Macpeak & Seas

[57] ABSTRACT

A cassette for optical fibers includes a bottom surrounded by discontinuous rim segments between which access channels for the fibers are delimited. Each of the access channels is delimited over a substantially identical width on the bottom by two facing sidewalls. A block projects from the bottom of the cassette and has two side faces facing end portions of corresponding adjacent rim segments at respective corners, thereby forming similar double access channels at the corners. An element of the first type or second type sized to the double access channels is selectively positioned within the double access channels. The element of the first type is constituted by a flexible slab having spaced parallel slots receiving and retaining bare fibers. A channel element of the second type is constituted by a rigid, U-shaped channel section part having two flanges interconnected by a web, with each flange including a series of teeth. The teeth delimit slots receiving and retaining protected fibers.

17 Claims, 3 Drawing Sheets

CASSETTE FOR OPTICAL FIBERS

The present invention relates to housings for coiling and optionally connecting optical fibers. Such housings may be termed "cassettes", and they are referred to as such below. The invention relates more particularly to retaining optical fibers received in a cassette.

BACKGROUND OF THE INVENTION

Such cassettes are designed to receive and to protect surplus lengths of optical fiber that are left at the end of one or more optical cables, and optionally to receive and to protect connections or "splices" between the fibers of a plurality of cables or between such fibers and optical jumpers.

Document FR-A-2 601 785 describes such a cassette for optical fibers. The cassette is assigned to coiling and to protecting surplus lengths of fiber at the end of a cable. That cassette includes a bottom in which a recess is delimited between a central cylinder on the bottom and a peripheral rim. Two access channels in the rim open out into the recess. The surplus lengths of fiber are coiled around the cylinder. A ring is preferably placed around the cylinder for the purposes of coiling the fibers. The ring is removed once all the fibers have been coiled, so as to give them more freedom, between the cylinder and the peripheral rim. A cover closes the cassette and covers both of the access channels.

In that document, the optical fibers extracted from the cable are protected inside individual flexible tubes when they are held in place in the access channels of the cassette, whereas they are bare when they are coiled inside the cassette.

The access channels are rectangular in cross-section or semi-circular in cross-section depending on whether the cable from which the fibers are extracted has a flat structure or a grooved-rod structure. The tubed fibers are aligned side-by-side in the rectangular section channel and are held thus by the cover fixed to the cassette. The tubed fibers are installed in the grooves of a barrel which is grooved lengthwise, and which is mounted in the semi-circular section channel, and the fibers are retained by the cover holding the barrel stationary, the cover then in turn being provided with a semi-cylindrical channel receiving the barrel.

Those ways of holding the fibers in the access channels correspond to two specific embodiments of cassettes for the two types of cable with which they are used. Those holding means require the fibers to be tubed even though they are coiled bare. The fact that the tubed fibers are aligned side-by-side inside the rectangular section access channel does not enable the fibers to be properly separated and properly held. With the variant embodiment, in which a barrel is placed in each semi-circular section access channel, it is difficult to install the fibers and to hold them in place temporarily until the cover has been fixed on the cassette. Furthermore, the tubed fibers being distributed around the periphery of a barrel makes it difficult for the fibers to be coiled loosely around the cylinder over the height of the recess surrounding the cylinder.

Document EP-A-0 216 073 discloses a cassette having two access channels provided between the ends of one of the two large edges of the cassette and the facing ends of the two small edges of the cassette. Each access channel receives a clamping body for clamping fibers and having parallel grooves, which clamping body is installed with its grooves in either one of two possible directions. To this end, the clamping body carries a projection projecting from underneath its bottom, which projection is received in one of two perpendicular slots that are provided on the cassette.

OBJECT AND SUMMARY OF THE INVENTION

An object of the present invention is to provide a "standard" cassette having access channels which are selectable to facilitate receiving and coiling the fibers in the cassette, the selected access channels being adapted to the bare fibers or o the tubed fibers they receive, so that the fibers received can be both separated and properly held.

The invention provides a cassette for optical fibers, said cassette including a bottom, two first opposite rim segments and two second opposite rim segments, the rim segments projecting from the same side of the bottom and substantially around the periphery thereof, and, between them, delimiting four corners of the cassette and an access for the fibers at at least one of the corners, means on the bottom for coiling said fibers and/or holding connections between coiled fibers, and an element equipping each access channel that receives the fibers, which element has slots for individually separating the fibers in line and guiding them, wherein each access, considered in its non-equipped state in which it is referred to as a "double access", the cassette includes a block projecting from the bottom and having two side faces facing the end portions of the corresponding rim segments, thereby dividing the double access into two substantially identical access channels whose sides are delimited by the two faces of the block and by the facing end portions of the rim segments, the faces and the end portions being referred to as the "sidewalls" of the two access channels making up the double access, and wherein said element fits each one of said access channels that is thus selectively equipped with such an element.

The cassette of the invention may further have at least one of the following additional features:

it has two facing recesses in the sidewalls of each access channel, in which recesses said element is positioned;

its two first rim segments are straight and its two second rim segments are curved, and at each double access, the end portion of the first rim segment in question projects relative t the end portion of the second rim segment in question;

it includes four double accesses respectively disposed at the four corners of the cassette;

said block is triangular in cross-section;

each block has an extension outwardly extending that one of the side faces of the block which is situated facing the end portion of the second rim segment;

in a selected one of the two access channels in turn belonging to a selected one of the double accesses, the cassette is selectively equipped with an element chosen from an element of a first type for holding bare fibers and constituted by a flexible slab, and an element of a second type for holding tubed fibers and constituted by a channel-section part, said channel-section part having two flanges interconnected by a web, each flange being formed by a series of teeth, the teeth on one flange facing the teeth on the other flange, and the teeth delimiting said slots in the part between one another;

it further includes an attached tab fixed on the block delimiting the access channel equipped with the element of said second type, said tab extending transversely across the access channel over said element of said second type; and said element of the first type is made of a foam material, and said element of the second type is rigid.

BRIEF DESCRIPTION OF THE DRAWINGS

The characteristics and advantages of the present invention appear from the following description of an embodiment given with reference to the accompanying drawings, in which.

MORE DETAILED DESCRIPTION

Figure 1:
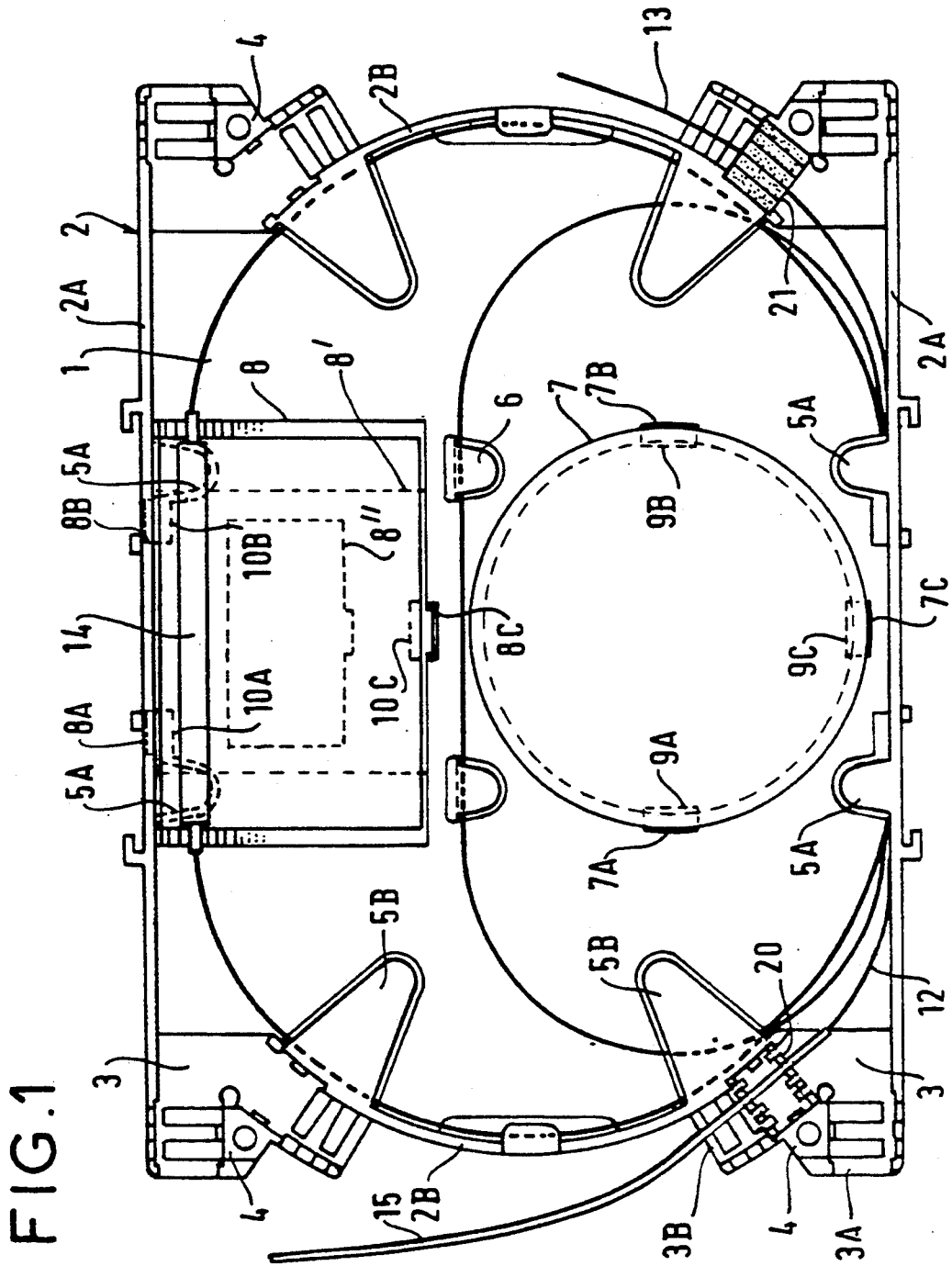
FIG. 1 is a plan view of a cassette for optical fibers that is equipped in accordance with the present invention.

The cassette shown in FIG. 1 includes a flat bottom 1 that is substantially rectangular and whose small edges are partially truncated and curved. A discontinuous rim 2 surrounds the bottom. The rim is formed by straight rim segments 2A along the large edges of the bottom, and by curved rim segments 2B along the small edges thereof. Four "double" accesses 3 for the fibers received in the cassette are delimited on the bottom between the respected straight and curved end portions of the rim segments 2A and 2B.

Blocks 4 project from the bottom substantially over the outer end of the double accesses 3. Each block divides the corresponding double access into two distinct access channels 3A, 3B coming together inside the cassette. The blocks 4 are of substantially the same height as the rim segments 2A and 2B and are of triangular cross-section. The blocks are described in more detail below.

Rim segments 2A have tabs 5A, and rim segments 2B have tabs 5B, the tabs extending parallel to the bottom towards the inside of the cassette. Two other tabs 6 project from the bottom substantially in the central portion thereof. Tabs 6 are slightly offset to one side of the middle longitudinal axis, and they extend towards the other side. They are symmetrical about the middle transverse axis. The tabs 5A, 5B, and 6 serve to hold the fibers that are coiled in the cassette underneath them.

The bottom is made of plastic. It is obtained by molding. The rim segments, the tabs and the blocks are obtained during molding of the bottom. The tabs, and in particular tabs 5A and 6, can be broken.

The bottom 1 carries a cylinder 7 and a connection support 8 for supporting the connections between the optical fibers, the cylinder and the support being removably mounted side-by-side over the width of the middle portion of the bottom. To this end, the cylinder 7 and the support 8 each have a respective set o three snap-fastening catches 7A, 7B, 7C or 8A, 8B, 8C depending on the element in question. The bottom 1 in turn has sets of three openings, such as 9A, 9B, and 9C, and 10A, 10B, and 10C, for the purposes of mounting such elements thereon. The connection support 8 may be chosen from a plurality of different types of support comprising, in addition to support 8, other supports such as 8' and 8" also having respective sets of snap-fastening catches. The cylinder 7 may in turn be replaced by one of the supports 8, 8', and 8", tabs 6 then being removed. The set of snap-fastening catches on the cylinder may be constituted by opposite tabs 7A and 7B only.

The bottom is made adaptable to requirements by being provided with other different sets of three openings (not shown), to which one or other of the abovementioned openings that are shown may belong, so as to enable a selected one of the connection supports and the cylinder to be mounted, or in a variant two of the connection supports to be mounted.

Two fibers 12 and 13 are shown received and coiled in the cassette, and connected together via a connection 14 retained on the support 8 selected for that type of connection. Naturally, the cassette may receive other fibers which are handled in the same way as the fibers 12 and 13.

The cassette is closed by means of a cover (not shown) which covers the rim segments and the double accesses 3.

Two of the double accesses 3 for receiving the fibers into the cassette are selected from the four double accesses that are provided, as a function of the way the bottom is adapted by the elements that are snap-fastened thereon. One of the access channels 3A, 3B of each double access is in turn selected for receiving fibers into the cassette with at least a minimum radius of curvature.

The two access channels that are selected for the fibers to be connected are equipped so that the fibers can be separated in line, i.e. side by side, and held at the selected access channel.

The element mounted in each access channel for this purpose is in turn adapted to the fibers received. It is of a first type 20 for fibers that are tubed, as shown for fiber 12 which enters the cassette inside a protective tube 15. The element is of a second type 21 for fibers that are bare, as shown for fiber 13.

The access channels 3A and 3B of one of the double accesses and the elements of the first type 20 or of the second type 21 that each of the channels can receive are described in detail with reference to FIGS. 2 to 5.

Figure 2:
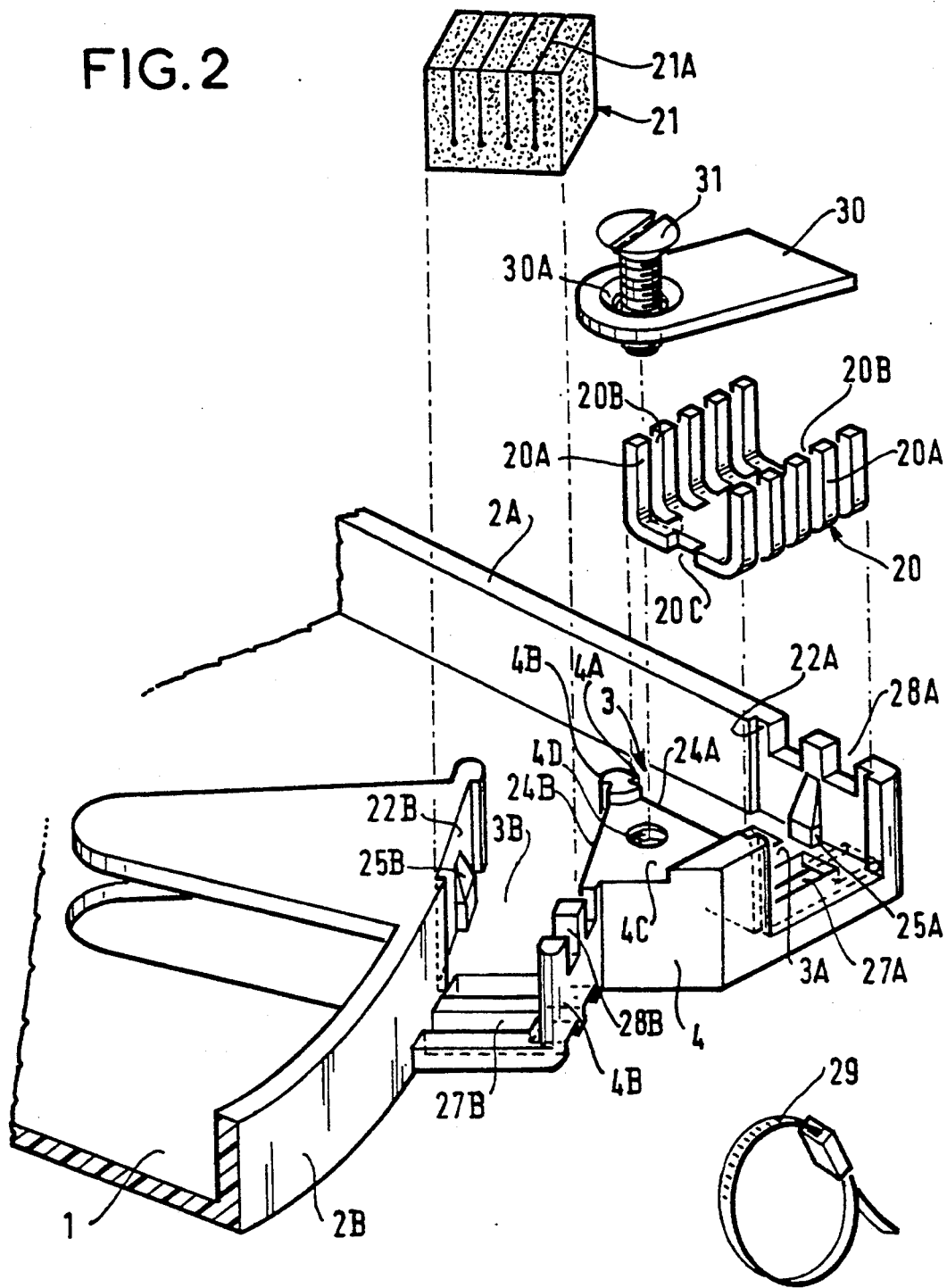
FIG. 2 is a fragmentary exploded perspective view showing ways of equipping, the access channels for receiving the fibers into the cassette.

In FIGS. 2 to 5, to facilitate understanding, the element 20 is angularly positioned to face the access channel 3B in FIG. 2, or is mounted in the access channel 3B in FIG. 2, and the element 21 is shown facing or inside (depending on the figure) the access channel 3A o the same double access 3. Either element 20 or 21 may be mounted interchangeably in either of the access channels 3A, 3B. In practice, two elements 20 and/or 21 are mounted in respective access channels belonging to two different double accesses.

Access channels 3A and 3B are substantially the same.

Each of them is of U-shaped cross-section, and its two sidewalls are delimited by the end portion of the corresponding rim segment 2A or 2B and by the end portion 4A or 4B of the side faces of the block 4 which is situated facing the rim segment in question. Each of the sidewalls has a recess inside the access channel, the recesses being referenced 22A, 22B in rim segments 2A, 2B, and 24A, 24B in the faces 4A, 4B of the block 4. The two recesses in each access channel face each other over the height thereof. Two projections 25A and 26A or 25B and 26B centered in the facing recesses on the bottom portions thereof project into each access channel. The edge between faces 4A and 4B of the block is rounded off.

The access channel 3A has two transverse apertures 27A in its bottom, which apertures open out onto the bottom portion of rim segment 2A, on either side of the projection 25A. The apertures correspond to two notches 28A provided in the top portion of the rim segment. Over channel 3B, the corresponding face 4B of the block 4 has an extension 4B'extending outwardly from the cassette. Two transverse apertures 27B in the bottom of the access channel 3B open out onto the bottom portion of the extension. Two notches 28B in the top portion of the extension correspond to the apertures.

The apertures and the notches serve to co-operate with a flexible collar 29 for holding the received fibers together, in particular when said fibers are tubed.

The block 4 further has a wide recess 4C and a central hole 4D in its top face. The recess 4C opens out onto the two side faces of the block delimiting the access channels.

The element 21 for separating and holding bare fibers is a single flexible slab or block. For example, it is made of relatively dense foam. It is dimensioned so as to fit between the two recesses in the access channel which receive it. The slab is then slightly pressed by the two projections that project into the access channel, and is preferably fixed, for example by gluing, to the bottom of the access channel.

Element 21 has a series of parallel slots 21A which open out on either side towards the outside of the cassette and towards the inside of the cassette, when the element is in position. The slots 21A extend downwardly from the top over a considerable portion of the height of the element. Each slot receives one or more fibers, such as fiber 13. In this way, element 21 constitutes a pad secured to the access channel for guiding the fibers, individually separating them in line, holding them in line, and protecting them.

Figure 3:
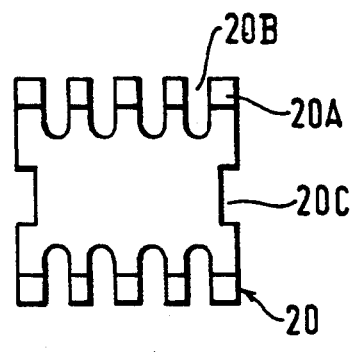
FIGS. 3 and 4 are respectively a plan view and a side view of one of the elements shown in FIG. 2.
Figure 4:
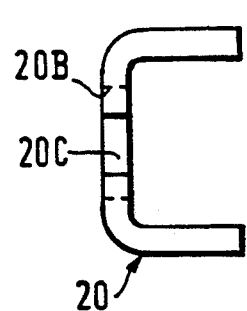
Figure 5:
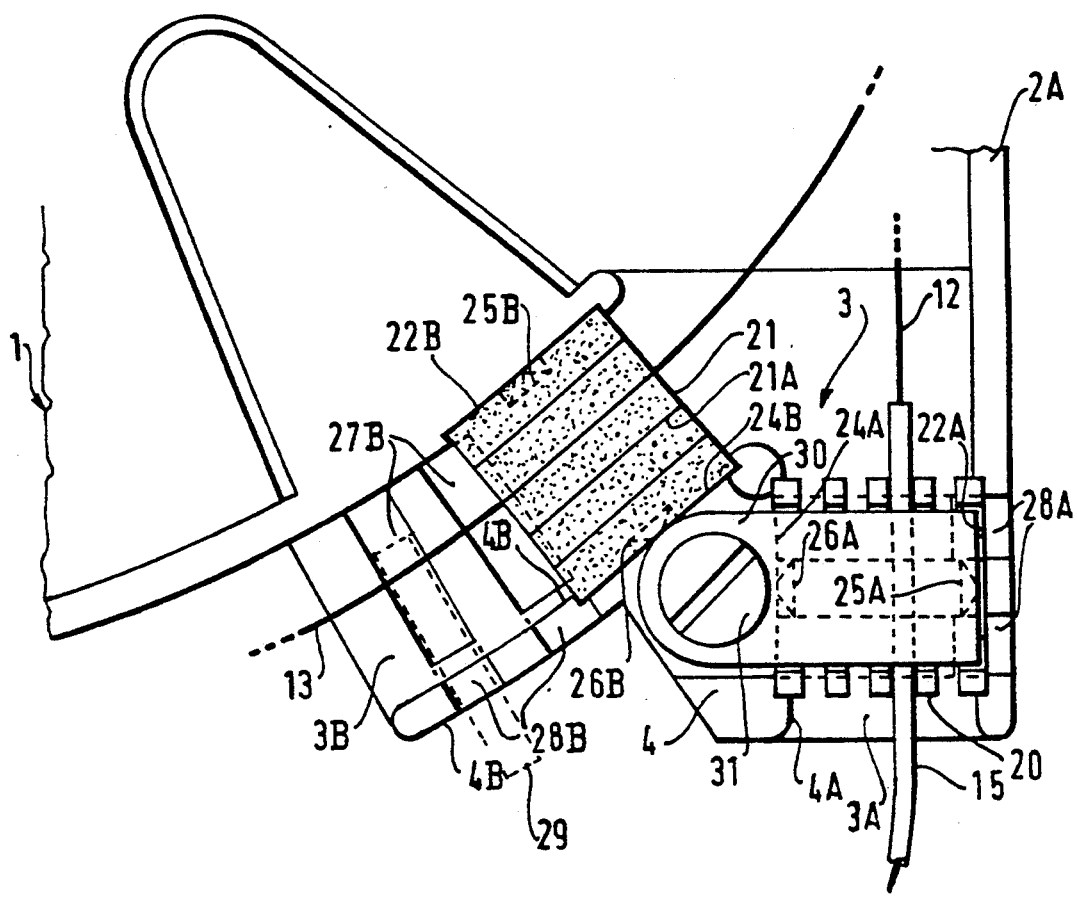
FIG. 5 is a fragmentary plan view of the cassette, corresponding to FIG. 2.

The element 20 for separating and holding tubed fibers is described with reference to FIGS. 2 and 5 and/or FIGS. 3 and 4. It is constituted by a relatively rigid, U-shaped channel-section part. It is dimensioned to fit between the two recesses in the access channel which receives it. The two flanges of the element 20 then extend transversely over the width of the access channel.

Each of the flanges of the element 20 is split into a series of teeth 20A by a series of slots 20B between the teeth. The slots 20B extend slightly into the web of the channel-section element 20, the teeth 20A being curved over a transition between the web and the flanges. The slots on one branch face the slots on the other branch. Each slot receives a fiber such as 12 inside a tube 15, or a plurality of tubed fibers, and the tube is nipped between the two teeth on either side of the slot on each branch.

Two notches 20C centered on the ends of the web of element 20 fit over the two projections 25B that project into the access channel, thereby directly holding element 20 in position.

A locking tab 30 is preferably associated with element 20. The width of the tab substantially corresponds to the gap between the flanges of element 20, but the tab is longer than the flanges so that an end can be received and fixed on the block 4. One end of the tab fits into the recess 4C provided for this purpose in the top face of the block.

A screw 31 inserted via a hole 30A in that end of the tab, and engaged in a tapped hole 4D in the block locks the tab in position.

The tab 30 and the element 20 are metal, are made of a lightweight alloy, or are made of plastic that is preferably harder than the material of which the fiber sheathing tubes are made.

Element 20 and the associated tab 30 operate in analogous manner to element 21, for fibers that are initially tubed. It should be noted that the protective tube 15 of the tubed fiber 13 extends only slightly beyond the element 20 in the cassette, FIG. 1 fiber 13 being coiled bare inside the cassette.

These dispositions make it possible to equip the access channels selectively (the access channels being in turn selected) without having to provide a specific cassette for each different way in which the cassette is used, and for the bare fibers and/or the tubed fibers received thereby.

We claim:

1. In a cassette for optical fibers, said cassette including a bottom, two first longitudinally opposite rim segments and two second, laterally opposite rim segments, said rim segments projecting from the same side of the bottom and substantially around a periphery thereof, said rim segments delimiting four corners of the cassette, and at least partially an access channel for the fibers at at least one of the corners, at least one of means on the bottom for coiling said fibers and means for holding connections between coiled fibers, and a slotted access channel element within said at least one access channel for receiving said fibers, said element having slots for individually separating the fibers in parallel and for guiding said fibers, the improvement wherein said cassette includes a block projecting from the bottom and having two side faces facing end portions of corresponding adjacent rim segments at said at least one corner, thereby forming similar double access channels having sides delimited by said two faces of said block and said facing end portions of said adjacent rim segments and constituting sidewalls of two separate access channels at said at least one corner, and wherein said access channel element is sized to fit each of said double access channels for selective positioning within a given one of said double access channels.

2. A cassette according to claim 1, having two facing recesses in the sidewalls of each access channel, and said opposite ends of said at least one element being positioned within said sidewall recesses.

3. A cassette according to claim 2, wherein said double access channels have projections projecting outwardly from said two facing recesses into each access channel, towards each other and said element includes notches at respective opposite ends thereof within which said projections are positioned.

4. A cassette according to claim 18, in which said first rim segments are straight and said second rim segments are curved, and wherein at each double access, an end portion of the first rim segment projects outwardly relative to an end portion of a second rim segment.

5. A cassette according to claim 4, wherein said at least one access channel consists of four double accesses respectively disposed at the four corners of the cassette.

6. A cassette according to claim 4, wherein each block has an outwardly extending extension from one side face of the block facing the end portion of the second rim segment partially defining an access channel therebetween.

7. A cassette according to claim 4, wherein each access channel has at least one transverse aperture in said bottom in the direction of the access channel width, said aperture receiving a collar for holding together the fibers received in the access channel.

8. A cassette according to claim 7, having at least one notch provided in one of the sidewalls of each access channel transverse to the access channel in a plane containing said aperture in the bottom of the access channel.

9. A cassette according to claim 4, wherein said channel element is a first type channel element for holding bare fibers received in the access channel, and being constituted by a flexible slab having spaced, parallel slots receiving and retaining said bare fibers.

10. A cassette according to claim 4, wherein said channel element is a second type channel element for holding protected fibers enclosed inside individual tubes and received in the access channel, and being constituted by a U-shaped channel-section part having two flanges interconnected by a web, each flange including a series of teeth, the teeth on one flange facing the teeth on the other flange, and said teeth delimiting slots receiving and retaining said protected fibers.

11. A cassette according to claim 4, wherein a selected one of said two access channels is equipped with an element of a first type constituted by a flexible slab having spaced, parallel slots receiving and retaining said bare fibers, and a second of said two access channels selectively receives an element of a second type for holding tubed fibers and constituted by a U-shaped channel-section part having two flanges interconnected by a web, each flange being formed by a series of teeth, the teeth on one flange facing the teeth of the other flange, and the teeth delimiting slots within which said protected fibers are received.

12. A cassette according to claim 10, further including an attached tab fixed to the block partially delimiting the access channel and being equipped with an element of said second type, said tab extending transversely across the access channel over said element of said second type and closing off said slots retaining said protected fibers.

13. A cassette according to claim 12, wherein each block has a recess in a top face thereof opposite the bottom, and said tab has one end thereof positioned in said top face recess.

14. A cassette according to claim 9, wherein the element of said first type is made of a foam material.

15. A cassette according to claim 10, wherein the element of said second type is a rigid member.

16. A cassette according to claim 15, wherein the element of said second type has notches in the ends of said web, said notches receiving projections projecting outwardly from said rim segment and said block face partially defining said access channel.

17. A cassette according to claim 15, wherein said slots are extended into said web.

* * * * *